Nov. 7, 1961 J. L. HILL 3,007,538
SPEED CONTROL APPARATUS AND METHOD
Filed March 14, 1957
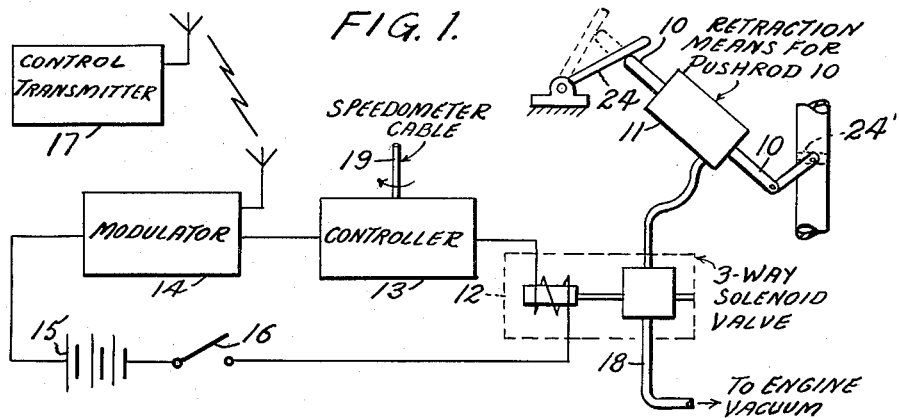
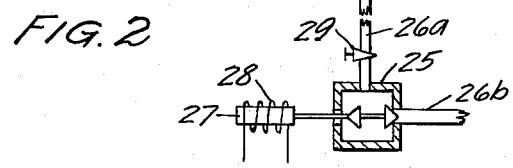
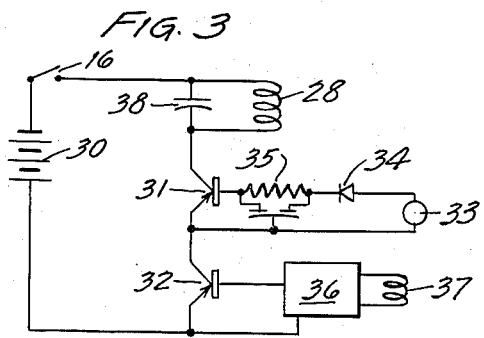
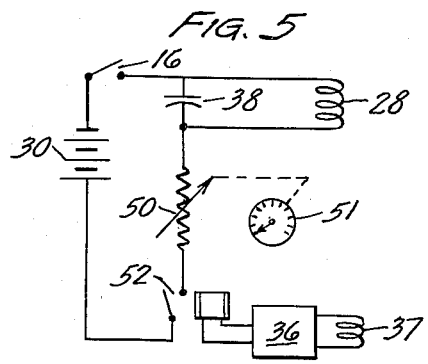
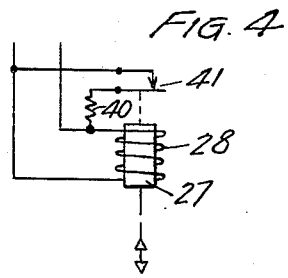
INVENTOR
JOHN L. HILL
BY
Gilbert B. Gehrenbeck
AGENT – # United States Patent Office 3,007,538
Patented Nov. 7, 1961

3,007,538
SPEED CONTROL APPARATUS AND METHOD
John L. Hill, 2838 Lake Blvd., North St. Paul, Minn.
Filed Mar. 14, 1957, Ser. No. 646,047
7 Claims. (Cl. 180—82.1)

This invention relates primarily to the speed control of vehicles and to apparatus for use in conjunction therewith. Although not restricted thereto, the invention has particular utility in the regulation and control of the maximum rate of travel of automobiles during passage of such vehicles through defined highway zones, i.e., in traffic control applications.

Governor devices which prohibit vehicular speeds above predetermined limits do not ordinarily differentiate between open highway and city streets, nor between normal and hazardous road conditions, nor between daytime and nighttime lighting; and hence are useful only for certain restricted types of operations. Speed control on highways has therefore been largely attempted by relying on visual warning signals and, in the case of the drivers tempted to ignore such signals, on the presence of strategically located traffic officers.

The present invention provides means for effectively and positively restraining the speed of automobiles or the like to any desired maximum within defined restricted zones or under defined conditions, while permitting higher speeds over other areas or under more favorable conditions. Regulation of maximum vehicular speed may be effected by sources outside the vehicle and not under the control of the driver. While positive regulation is assured, infrequent short bursts of speed are not prohibited. e.g. where required to avoid danger. The apparatus is relatively simple and inexpensive, easily installed, and fully effective. It is particularly well adapted for use in connection with conventional internal combustion engines as used on automobiles.

The rate of travel of automobiles is ordinarily controlled by the driver through operation of a single manual control, namely, an accelerator pedal. The accelerator, through an intermediate mechanical throttle linkage, governs the supply of fuel to the engine and thus controls the speed of the vehicle. One aspect of the present invention involves the provision of a retractable component for the throttle linkage. Retraction of such component, accomplished through suitable auxiliary devices at a time and to a degree determined by forces not under the control of the driver, effectively prevents operation of the vehicle at greater than permitted speeds during such time intervals. The invention also provides simple and effective control means for bringing about such retraction, and to the desired degree. Other advantages of the invention will be made apparent.

In the drawing,

FIGURE 1 is a representation of a typical control system of the invention in the form of a block diagram;

FIGURE 2 is a view, partly in section, of a retractable component in a throttle linkage and including schematic representations of throttle, accelerator, and control valves;

FIGURE 3 is a circuit diagram of a preferred mobile control circuit;

FIGURE 4 is a circuit diagram of an auxiliary regulating circuit; and

FIGURE 5 is a circuit diagram of an alternative form of mobile control circuit.

The control system of FIGURE 1 is includes a retractable push-rod component 10 forming a part of the speed control linkage, retraction means 11 for regulating the retraction of the retractable push-rod 10, valve means 12 for activating and de-activating the retraction means 11, controller or means 13 (more particularly shown in FIGURE 3) for providing control of energy at a level dependent on vehicular speed, modulator means 14 providing for modulation of speed-control energy, and energy source 15. The series circuit through elements 12—15 is here shown to be completed through a switch 16. Modulator means 14 is energizable by external control means 17.

In a preferred automotive speed-control system, the push-rod 10 forms a part of the throttle linkage and is retractable under evacuation through retraction means 11 connected to the vacuum system of the engine through tube 18; the generator or controller 13 is mechanically connected to the speedometer cable 19; the storage battery acts as the energy source 15; and the switch 16 is operated by the ignition switch of the automobile.

An exemplary retractable push-rod component 10 is indicated in greater detail in FIGURE 2. The push-rod 10 is here shown to include a piston 20 slidably fitting within a cylinder 21 and under normal conditions being retained against stop 22 by a compression spring 23. Pressure on the accelerator pedal 24 acting through the push-rod 10 will be seen to open the throttle valve 24'. The interior of cylinder 21 is connected by a flexible tube 26a to valve 25 and thence, when the valve is in open position, to vacuum through tube 26b. With the valve in closed position as shown, the interior of the cylinder is seen to be open to the atmosphere, in which position the spring 23 maintains the push-rod assembly 10 in fully extended position against all normal pressures on the accelerator.

The valve 25 is opened and closed electromagnetically by means of a plunger 27 operating within a magnetic coil 28, and is designed to remain in either fully opened or fully closed position. A rate-control valve 29 may be included where desired, for regulating the rate at which air may flow into or out of the push-rod cylinder 21; or the desired rate of flow may be determined by the size of the openings in the flexible connecting tubes or other passages.

It will be apparent that, with the automobile in motion, opening the valve 25 will result in evacuation of the cylinder 21, shortening of the push-rod assembly 10, closing of the throttle valve 24', and reduction in vehicle speed. Subsequently closing the valve 25 permits air to reenter the cylinder, the piston is then returned to position against the stop 22 by pressure from the spring 23, and the throttle valve may again be opened. The maximum retraction possible in the push-rod asembly is at least equivalent to the maximum depression of the accelerator pedal 24, so that permitting the valve 25 to remain in open position will necessarily slow the engine to idling speed regardless of pressure on the accelerator pedal.

The electromagnetically operable valve 25 of FIGURE 2, with the associated throttle control linkage, acts as an energy-operated speed-control mechanism. Speed-control energy is applied to said mechanism from the energy source 15. More specifically, actuation of the valve 25 is accomplished by passing current through coil 28 from the control circuit shown in FIGURE 3 and including, in series with the coil, a switch 16, battery 30, and two transistors 31 and 32. Current flowing through this circuit at or above a defined limiting minimum value will open the valve 25, resulting in a decrease in vehicular speed. At lower current values the valve 25 will again close.

The magnitude of the speed-control energy applied to the valve 25 is directly proportional to the vehicular speed throughout the operating range. Specifically, the passage of current through transistor 31 is controlled by a relatively very small current flowing in the base-to-emitter circuit, which circuit is here shown to include a generator 33, avalanche diode 34, and filter circuit 35. The generator 33 is conveniently attached to the same shaft which operates the speedometer. The output of the generator then has a frequency and voltage both of which are proportional to the vehicle speed and are zero at zero speed. The diode 34 prevents the flow of current from the generator to the transistor except during such time as the generator voltage exceeds a defined minimum value depending on the characteristics of the diode. At less than this defined minimum value, no current flows in the base-to-emitter circuit, and hence no significant current may flow in the collector-to-emitter circuit, of the transistor 31. At or above the defined minimum generator voltage, the current flowing in these circuits is in each case proportional to the speed of the generator and hence to the speed of the vehicle. In the absence of the avalanche diode the current is still proportional to speed but may be undesirably large at low vehicular speeds. While the presence of the diode is not essential, it is therefore preferred.

The transistor 31 has the intrinsic property that its collector-to-emitter current is substantially a linear function of its base current over a wide range of collector-to-emitter voltages. Accordingly, the current flowing in the series circuit of FIGURE 3 can be related to the vehicle speed by providing that the transistor 31 be the current limiting element in such circuit. This is readily accomplished by winding the coil 28 with a low resistance and operating the transistor 32 in the saturated condition. In other words, a continuous electric current is made available which is dependent upon the speed of the vehicle itself. As hereinafter will appear, though, this current will be interrupted in a prescribed manner to produce a desired average current through the coil 28 of valve 25.

Flow of current through the coil 28 is normally opposed by transistor 32, being permitted only when the latter is in saturated condition. With continuous current flow through coil 28, minimum controlled vehicular speed is established. At zero current flow, valve 25 remains closed and does not control vehicular speed. The average effective time, as a fraction of total elapsed time, during which current is permitted to flow through transistor 32 and through the control circuit is thus inversely proportional to the maximum vehicular speed to be permitted. Thus the averaged value of the control current at the coil 28 is proportional to the product of this fraction times the magnitude of the current which can flow through transistor 31 at the prevailing vehicular speed.

Modulation, or proportioning of flow time, of the control current passing through transistor 32 is accomplished with external signals from source 17, as will now be further described.

To bring transistor 32 to a saturated condition it is necessary that the receiver-rectifier unit 36 provide adequate base current. This unit is actuated by externally produced signals which are picked up in coil 37. Typically, low frequency radio signals are provided by the transmitter 17 of FIGURE 1 acting through a signal-radiating conductor such as a buried or overhead cable adjacent the roadway. These signals are picked up in coil 37, converted and amplified in unit 36, and the resulting current supplied to the base of transistor 32 to place it in saturation. In the absence of such signals, the transistor conducts no significant current and the entire speed-control circuit is rendered inactive.

Signals emanating from transmitter 17 may be either continuous or discontinuous. A continuous signal will place the transistor 32 in continuous saturation. Control is then exercised only by transistor 31, the operation of which is related to vehicle speed. Above some fixed speed, which is defined by the circuit components and constants employed, the current passed by transistor 31 will be sufficient, operating through coil 28, to open the valve 25 and reduce the effective length of the push-rod 10 of FIGURE 2. As the speed of the vehicle then decreases, the current flowing from the generator 33 through the base-to-emitter circuit, and hence also the current flowing in the collector-to-emitter circuit, of transistor 31 similarly decreases until, at some value slightly below the "open" value, the valve 25 will close. The maximum maintained speed of the vehicle will therefore be held between narrow limits corresponding to the "open" and "close" values of the control current through transistor 31.

It is desirable to have the "open" and "close" values very nearly the same so that a substantially constant maximum engine speed may be maintained. On the other hand, there must be some difference between the two values if "flutter" is to be avoided in valve 25. A convenient differential may be of the order of one mile per hour at a speed of 30 miles per hour; for example, the apparatus may be adjusted to open the valve at 30 m.p.h. and to permit it to close at 29 m.p.h. In some cases the design of the valve itself may permit operation within such range. An auxiliary circuit as indicated in FIGURE 4 may alternatively be used. There is provided a resistor 40 and contacts 41, the contacts being closed when the plunger 27 is actuated and the valve is in open position, and open when the valve is in closed position. The small fraction of current by-passing coil 28 through resistor 40 permits the valve to close when the total current from the control circuit is reduced a lesser amount than would otherwise be necessary.

Regulation with continuous signal from transmitter 17 will be seen to reduce the maximum maintained vehicular speed to the lowest possible value. Proper circuit constants may be chosen to provide that such value may, for example, be 30 m.p.h. It is frequently desirable to permit higher speed limits under other conditions or in other traffic zones. The present invention easily provides for regulation to any desired maximum simply by substituting a proper periodically interrupted discontinuous or pulsating signal in place of the continuous signal from the transmitter 17.

At high vehicular speeds the transistor 31 is capable of passing more current than is required to operate the valve 25. During signal interruptions the transistor 32 passes no current, and hence no current flows in the control circuit. At some defined proportion of periodic interruptions the average value of the current flowing in the circuit will become exactly equal to that required for operation of the valve 25. The correct proportion may be defined for any desired maximum maintained speed. More specifically, the following relation exists:

Controlled speed = Minimum controlled speed $\times \frac{A+B}{A}$ where

A = Interval of signal on and

B = Interval of signal off

For example, if the current determined by transistor 31 at 60 m.p.h. is double that required to operate valve 25, then a signal which is interrupted one-half the time will effect control at 60 m.p.h. A capacitor 38 is desirably placed across the coil 28 to smooth out the pulsating control current. The constants of the circuit are not critical except that the resonant frequency of coil 28 and capacitor 38 should be less than the frequency of the pulsating signal.

It is to be noted that the control action of the circuit illustrated in FIGURE 3 is substantially instantaneous. Excitation of the receiver-rectifier unit 36 while the vehicle is proceeding at a speed in excess of the maximum for which the exciting signals are designed causes immediate flow of speed-control current in the series circuit and through coil 28, and the valve 25 is immediately opened. However the throttle valve does not abruptly close, since an appreciable time interval is required for air to be removed from the cylinder 10. This time lag may be lengthened significantly, for example by constricting the passages within the connecting tubes or by partially closing the valve 29. The time delay feature is valuable also in permitting short bursts of speed, for example when necessary in avoiding an accident even though the vehicle may be within a speed-control zone and already traveling at maximum speed for such zone. However it is not possible, with the control apparatus as described and in operation, to maintain a speed in excess of the maximum corresponding to the control signal for any extended period of time.

The completely independent nature of the magnitude function, represented by the electrical circuit, and the rate function, represented by the mechanical linkage, as hereinbefore described is of considerable practical importance, particularly from the point of view of the designer.

The foregoing description has been directed to one specific form of the invention which is particularly preferred for application to automobiles. Various useful modifications are available, however, as will now be indicated.

The control circuit of FIGURE 5 employs a coil 28, capacitor 38, switch 16 and battery 30 as in the circuit of FIGURE 3. However the transistor 31 and its control circuit are replaced by a variable resistor 50 mechanically connected to a speed-indicating device such as a speedometer 51 so that the resistance imposed in the circuit has an inverse relationship with the vehicular speed. The transistor 32 is replaced by a relay 52 which may be closed by current provided from the receiver-rectifier unit 36 when actuated by signals picked up in coil 37. These replacement components operate as do the components of the circuit of FIGURE 3 to open the valve 25 whenever a signal is picked up which represents a speed less than the speed at which the vehicle is then progressing.

Likewise, where push-rod unit 10 is retracted by external air pressure against reduced internal pressure, various other means of retraction may be substituted. For example, a motor-driven screw operated from the storage battery may be employed to decrease or increase the distance between a fixed terminal and a movable terminal, in which case an electrical rather than a pneumatic valve would be indicated. Angular change rather than change in length is useful in some types of control linkages and may be obtained with torsional throttle-control units. Tensional units in place of thrust units are likewise useful in some throttle control systems, the operation of other parts of the control system being then appropriately altered.

The receiver-rectifier unit 36 and the transmitter unit 17 have been described in terms of electromagnetic wave propagation and reception, but other means of transmitting intelligence to the mobile control system are also contemplated, such as generators and receivers of ultrasonic vibrations. Light rays are also useful for such transmission under some specialized conditions. The transmitter system will normally be in fixed position adjacent the highway as previously noted, and in such position is easily re-adjusted to any desired control speed by authorized personnel or by automatic devices and in conformity with changing travel conditions. Alternatively the transmitter mechanism may be made mobile and under the direct and immediate control of traffic officers, e.g. operating from police cars. Simplified transmitter mechanism or equivalent may also be installed on the vehicle together with the speed control equipment, the combination then serving as a conventional governor mechanism. Various visual or other indicating devices may be suitably employed in conjunction with the control mechanisms.

Although the invention has been described mainly in terms of highway speed control for automobiles, it is equally well adapted for speed control of trains, boats, stationary power plants such as motors, engines and other sources of power, and other analogous systems in which variable speed is obtainable through a single manual control.

What I claim is:

1. In a speed-control system for establishing a maximum maintained speed of a source of power having an energy-operated speed-reducing mechanism, a speed control for said mechanism including, in combination, a source of control energy, means for applying control energy from said source to said speed-reducing mechanism, means for transmitting externally supplied successive control signals in accordance with said maximum speed to be established, first control means for maintaining the magnitude of all such control energy directly proportional to said speed, and second control means responsive to externally supplied successive control signals for permitting flow of said control energy solely during reception of said successive signals; the averaged value of said control energy resulting from said successively received signals thereby being made proportional to the product of said magnitude and the fraction of total elapsed time during which said signals are received.

2. In a speed-control system for establishing a maximum maintained speed of a self-propelled vehicle having a speed-reducing throttle mechanism operable by an electric current, a control circuit including, in combination, a source for supplying said current, electromagnetically controllable means for operating said throttle mechanism on passage of said current, an external transmitting source for producing intermittent signals in accordance with said maximum speed to be established, first control means for maintaining the magnitude of said current directly proportional to the speed of said vehicle, and second control means responsive to said intermittent signals supplied from said source external of said vehicle for permitting flow of said current solely during intervals of reception of said intermittent signals; the averaged value of the applied current thereby being made proportional to the product of said magnitude and the fraction of total elapsed time during which said intermittent signals are received.

3. In a system for controlling the speed of a vehicle, an adjustable mechanism for varying the speed of said vehicle, means for producing a control signal representative of a desired maximum vehicle speed, speed responsive means for providing a continuous electrical signal having a magnitude proportional to the vehicle's actual speed within a certain speed range, means responsive to said control signal for repeatedly interrupting said continuous signal for specific successive on and off intervals, the ratio of said on and off intervals being in accordance with said desired maximum speed that should be maintained, and means responsive to the discrete signals resulting from the repeated interruption of said continuous signal for operating said adjusting mechanism to reduce the speed of the vehicle if the average value of said discrete signals is greater than a prescribed magnitude.

4. In a system for controlling the speed of a vehicle, an adjustable mechanism for varying the speed of said vehicle, a transmitter spaced from said vehicle for producing a control signal representative of a preferred speed within a desired minimum and maximum speed range, first means for operating the adjustable mechanism in one direction to cause an increase in vehicle speed, second means including an electromagnet for operating said mechanism in a second direction to cause a decrease in vehicle speed, said electromagnet being responsive to a given magnitude of electrical signal in effecting the last-mentioned operation, means for generating a relatively steady electrical signal having a magnitude proportioned to the actual speed of the vehicle within said desired minimum and maximum speed range, said generating means providing a signal equal to said given magnitude at said minimum desired speed, and means responsive to said control signal for applying said electrical signal to said electromagnet in an uninterrupted form when it is desired to cause the vehicle to travel at said minimum speed and for applying said electrical signal to said electromagnet in a repeatedly interrupted form when it is desired to permit the vehicle to travel at a speed above said minimum speed, whereby the ratio of the various periods of noninterruption to the periods of interruption will determine the allowable speed for the vehicle due to the decrease in the strength of the average signal caused by such interruptions.

5. In a system for controlling the speed of a vehicle, electromechanical means for varying the speed of said vehicle, speed responsive means for generating a voltage sufficient to provide an electric current of one magnitude when the vehicle is traveling at one preferred speed, said current having said one magnitude being just sufficient to operate said electromechanical means in a direction to initiate a lowering of the vehicle's speed, and said voltage being proportionately greater when said vehicle is traveling at a greater speed, means for producing a control signal representative of a desired vehicle speed, and means responsive to said last-mentioned means for establishing a conductive path to said electromechanical means at various intervals dictated by said control signal so that the current supplied by said speed responsive means will be instrumental in causing operation of said electromechanical means whenever the average current is above said one magnitude so as to limit the vehicle's speed to a preferred speed above said one speed in accordance with said control signal.

6. In a system for controlling the speed of a vehicle, a mechanism for varying the speed of said vehicle, a transmitter located at a remote vantage point with respect to said vehicle for transmitting a signal indicative of a desired maximum speed for said vehicle, means for causing operation of said mechanism including a solenoid, a source of electric power in circuit with the solenoid for energizing said solenoid to cause operation of said mechanism in a direction to reduce the speed of the vehicle, a first electric device in series with said solenoid and energizing source for varying the magnitude of current permitted to pass through said solenoid, means for effecting the operation of said first device in accordance with the actual vehicle speed so that said first device varies the magnitude of current permitted to pass through said solenoid in accordance with said actual speed, a second electric device in series with said solenoid, energizing source and first device for opening and closing the circuit to said solenoid, means responsive to said transmitted signal for effecting the operation of said second device at repeated intervals in accordance with said desired maximum vehicle speed, whereby the average amount of current permitted to flow through said solenoid will be influenced by the operation of both of said devices.

7. In a system for controlling the speed of a vehicle, a mechanism for varying the speed of said vehicle, means for producing a control signal representative of a desired vehicle speed, speed responsive means for providing a continuous signal having a value dependent upon the actual speed of the vehicle within a preferred speed range, means responsive to said control signal for interrupting said continuous signal for specific successive intervals in accordance with said desired vehicle speed, and means responsive to the resulting interrupted signal for operating said mechanism to reduce the speed of the vehicle if the average value of said resulting signal is above a given value required to operate said speed varying mechanism.

References Cited in the file of this patent

UNITED STATES PATENTS

| | | |
|---|---|---|
| Re. 21,818 | Halstead | June 3, 1941 |
| 1,266,389 | Betz | May 14, 1918 |
| 1,566,376 | Couty | Dec. 22, 1925 |
| 1,767,609 | Murray | June 24, 1930 |
| 2,077,555 | Frantz | Apr. 20, 1937 |
| 2,188,293 | Williams | Jan. 23, 1940 |
| 2,188,704 | Claytor | Jan. 30, 1940 |
| 2,209,158 | Goldsmith | July 23, 1940 |
| 2,236,145 | Kolb | Mar. 25, 1941 |
| 2,454,659 | Leonard | Nov. 23, 1948 |
| 2,656,002 | Keeton et al. | Oct. 20, 1953 |
| 2,702,342 | Korman | Feb. 15, 1955 |
| 2,780,300 | Beyer | Feb. 5, 1957 |
| 2,804,160 | Rashid | Aug. 27, 1957 |
| 2,847,080 | Zworykin et al. | Aug. 12, 1958 |